United States Patent
Hashizume

(10) Patent No.: US 10,808,601 B2
(45) Date of Patent: Oct. 20, 2020

(54) INTERNAL COMBUSTION ENGINE WITH COMBUSTION BY INJECTING FUEL INTO A COMPRESSED COMBUSTION CHAMBER THAT INCLUDES A HOLLOW DUCT

(71) Applicant: TOYOTA JIDOSHA KABUSHIKI KAISHA, Toyota-shi, Aichi-ken (JP)

(72) Inventor: Takeshi Hashizume, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 5 days.

(21) Appl. No.: 16/240,939

(22) Filed: Jan. 7, 2019

(65) Prior Publication Data
US 2019/0277185 A1    Sep. 12, 2019

(30) Foreign Application Priority Data
Mar. 7, 2018 (JP) ................. 2018-041048

(51) Int. Cl.
*F02M 61/18* (2006.01)
*F02B 1/12* (2006.01)
(Continued)

(52) U.S. Cl.
CPC ............ *F02B 1/12* (2013.01); *F02B 3/06* (2013.01); *F02B 23/02* (2013.01);
(Continued)

(58) Field of Classification Search
CPC .......... F02M 61/1806; F02M 61/1813; F02M 61/161; F02M 45/02; F02M 31/20; F02M 61/14; Y02T 10/125; F02B 1/12; F02B 3/06; F02B 23/02; F02B 23/0651; F02B 23/0669; F02D 35/028; F02D 41/047;
(Continued)

(56) References Cited

U.S. PATENT DOCUMENTS 6,302,080 B1 * 10/2001 Kato ................... F02D 41/3827
                                                               123/295
8,967,129 B2 * 3/2015 Mueller ................... F02B 3/00
                                                               123/193.4
(Continued)

FOREIGN PATENT DOCUMENTS

| EP | 3255269 A1 | 12/2017 |
| JP | 2017-530298 A | 10/2017 |

OTHER PUBLICATIONS

M. Zao; "Control Systems for Diesel Engines" KZhl "Za Rulem"; May 2004.-480p.; In 62.

*Primary Examiner* — Hai H Huynh
*Assistant Examiner* — Gonzalo Laguarda
(74) *Attorney, Agent, or Firm* — Oliff PLC

(57) ABSTRACT

An internal combustion engine includes a fuel injection nozzle provided with a nozzle hole for injecting fuel, the nozzle hole exposed from a cylinder head of the internal combustion engine to a combustion chamber, and a hollow duct, an inlet and an outlet of which are exposed to the combustion chamber. The duct is provided in a manner allowing fuel spray injected from the nozzle hole of the fuel injection nozzle to pass through from the inlet to the outlet. The fuel injection nozzle and the duct are configured such that a part of fuel spray that is injected in pilot injection that is performed before main injection directly adheres to an inner wall surface of the duct.

5 Claims, 7 Drawing Sheets

(51) Int. Cl.
| | |
|---|---|
| *F02B 3/06* | (2006.01) |
| *F02D 35/02* | (2006.01) |
| *F02D 41/30* | (2006.01) |
| *F02D 41/40* | (2006.01) |
| *F02B 23/06* | (2006.01) |
| *F02M 45/02* | (2006.01) |
| *F02B 23/02* | (2006.01) |
| *F02D 41/04* | (2006.01) |
| *F02M 61/16* | (2006.01) |
| *F02B 75/12* | (2006.01) |
| *F02M 61/14* | (2006.01) |

(52) U.S. Cl.
CPC ...... *F02B 23/0651* (2013.01); *F02B 23/0669* (2013.01); *F02D 35/028* (2013.01); *F02D 41/047* (2013.01); *F02D 41/3017* (2013.01); *F02D 41/40* (2013.01); *F02D 41/403* (2013.01); *F02M 45/02* (2013.01); *F02M 61/161* (2013.01); *F02B 2075/125* (2013.01); *F02D 35/023* (2013.01); *F02M 61/14* (2013.01); *F02M 61/1806* (2013.01); *F02M 61/1813* (2013.01)

(58) Field of Classification Search
CPC .... F02D 41/3017; F02D 41/40; F02D 41/403; F02F 1/24
USPC ........ 123/470, 298, 435; 239/533.11, 533.12
See application file for complete search history.

(56) References Cited

U.S. PATENT DOCUMENTS

| | | | | |
|---|---|---|---|---|
| 9,803,538 | B2* | 10/2017 | Anders | F02B 23/0627 |
| 9,915,190 | B2* | 3/2018 | Koci | F02B 23/10 |
| 10,012,196 | B1* | 7/2018 | Qi | F02M 61/14 |
| 10,119,456 | B2* | 11/2018 | Fitzgerald | F02B 23/00 |
| 10,138,855 | B2* | 11/2018 | Mueller | F02P 23/04 |
| 2016/0097360 | A1* | 4/2016 | Mueller | F02M 61/14 123/294 |
| 2016/0169086 | A1* | 6/2016 | Svensson | F02B 23/02 123/294 |
| 2016/0298531 | A1* | 10/2016 | Anders | F02B 23/00 |
| 2016/0298583 | A1* | 10/2016 | Anders | F02M 55/00 |
| 2016/0298584 | A1* | 10/2016 | Svensson | F02B 23/02 |
| 2017/0009712 | A1* | 1/2017 | Svensson | F02M 31/20 |
| 2017/0089310 | A1* | 3/2017 | Svensson | F02B 23/0618 |
| 2017/0114998 | A1* | 4/2017 | Mueller | F02B 23/0651 |
| 2017/0241368 | A1* | 8/2017 | Anders | F02B 23/0651 |
| 2018/0258836 | A1* | 9/2018 | Anders | F02B 23/0651 |
| 2019/0063391 | A1* | 2/2019 | Martin | F02B 23/0669 |
| 2019/0195183 | A1* | 6/2019 | Hashizume | F02B 23/0666 |
| 2020/0011236 | A1* | 1/2020 | Tanno | F02M 61/1806 |

* cited by examiner

INTERNAL COMBUSTION ENGINE WITH COMBUSTION BY INJECTING FUEL INTO A COMPRESSED COMBUSTION CHAMBER THAT INCLUDES A HOLLOW DUCT

CROSS-REFERENCE TO RELATED APPLICATION

The present disclosure claims priority under 35 U.S.C. § 119 to Japanese Patent Applications No. 2018-041048, filed on Mar. 7, 2018. The contents of this application are incorporated herein by reference in their entirety.

FIELD

The present disclosure relates to an internal combustion engine, and more particularly, to a compressed self-ignition type internal combustion engine that performs combustion by directly injecting fuel into a compressed combustion chamber.

BACKGROUND

Conventionally, for example, JP 2017-530298 A discloses, with respect to a compressed self-ignition type internal combustion engine, a technique for promoting premixing of fuel and charged air in a combustion chamber. With this technique, a duct configured by a hollow pipe is provided near an opening portion in a tip end portion of a fuel injection device that is exposed to the combustion chamber. Fuel that is injected from the opening portion is injected into the combustion chamber through the hollow pipe. Inside the hollow pipe, premixing with the charged air is promoted in the process of the injected fuel passing through. Distribution of excessively rich fuel is thereby reduced in the combustion chamber, and generation of smoke is reduced.

SUMMARY

However, with the above-described conventional technique, the duct is arranged suspended in the combustion chamber. With such a configuration, the duct is possibly overheated when combustion in the combustion chamber is continuously performed. In this case, evaporation of the fuel is promoted in the process of the fuel passing through the duct, and combustion is likely to occur before premixing with the charged air advances.

The present disclosure is made in the light of the problem as described above, and its object is to provide an internal combustion engine which is capable of suppressing generation of smoke by promoting premixing of fuel.

In order to attain the above object, a first aspect of the present disclosure is directed to an internal combustion engine of a compressed self-ignition type that performs combustion by injecting fuel into a compressed combustion chamber. The internal combustion engine includes a fuel injection nozzle provided with a nozzle hole for injecting fuel, the nozzle hole exposed from a cylinder head of the internal combustion engine to the combustion chamber, and a hollow duct, an inlet and an outlet of which are exposed to the combustion chamber. The duct is provided in a manner allowing fuel spray injected from the nozzle hole of the fuel injection nozzle to pass through from the inlet to the outlet. The fuel injection nozzle and the duct are configured such that a part of fuel spray that is injected from the nozzle hole in pilot injection that is performed before main injection directly adheres to an inner wall surface of the duct.

A second aspect of the present disclosure is the first aspect further including the following feature.

The fuel injection nozzle is configured such that a spray angle of the fuel spray that is injected from the nozzle hole is adjustable. The fuel injection nozzle is adjusted to a spray angle at which a part of the fuel spray that is injected from the nozzle hole in the pilot injection directly adheres to the inner wall surface of the duct.

A third aspect of the present disclosure is the first aspect further including the following feature.

The internal combustion engine further includes an electronic control unit that adjusts an amount of fuel adhesion of fuel that directly adheres to the duct in the pilot injection. The electronic control unit is configured to acquire an index value that serves as an index for a temperature of the duct, and in a case where the index value is in a region corresponding to a high-temperature region of the temperature of the duct, to increase the amount of fuel adhesion compared to a case where the index value is in a region corresponding to a low-temperature region.

A fourth aspect of the present disclosure is the third aspect further including the following feature.

The fuel injection nozzle includes a body including the nozzle hole at a tip end portion, a needle valve that is housed in a manner capable of moving along an axial direction inside the body, and an actuator that adjusts an amount of lift of the needle valve from a seated position. The fuel injection nozzle increases an injection angle of fuel injection from the nozzle hole as the amount of lift of the needle valve from the seated position becomes smaller. The electronic control unit is configured to operate the actuator according to the index value.

A fifth aspect of the present disclosure is the fourth aspect further including the following feature.

In a case where the index value is in a region corresponding to the high-temperature region of the temperature of the duct, the electronic control unit is configured to operate the actuator such that a maximum value of the amount of lift in the pilot injection is reduced than in a case where the index value is in a region corresponding to the low-temperature region.

A sixth aspect of the present disclosure is the fourth aspect further including the following feature.

In a case where the index value is in a region corresponding to the high-temperature region of the temperature of the duct, the electronic control unit is configured to operate the actuator such that a rising speed to a maximum value of the amount of lift or a lowering speed from the maximum value in the pilot injection is reduced than in a case where the index value is in a region corresponding to the low-temperature region.

A seventh aspect of the present disclosure is the fourth aspect further including the following feature.

In a case where the index value is in a region corresponding to the high-temperature region of the temperature of the duct, the electronic control unit is configured to operate the actuator such that a period when the amount of lift takes a maximum value in the pilot injection is reduced and a number of times of the pilot injection is increased than in a case where the index value is in a region corresponding to the low-temperature region.

According to the first aspect, a part of the fuel spray that is injected into the combustion chamber in the pilot injection directly adheres to the inner wall surface of the duct provided inside the cylinder head. The duct is cooled by latent heat of the adhered fuel. Overheating of the duct is thereby prevented, and fuel spray that is injected in the subsequent main injection is effectively cooled in the course of passing through the duct. Premixing with charge air is thus advanced while preventing self-ignition of fuel spray, and excessively rich fuel may be prevented from burning. Accordingly, thermal efficiency may be increased due to reduction of smoke and reduction in an afterburning period.

According to the second aspect, the spray angle of the fuel injection nozzle may be adjusted in such a way that a part of the fuel spray directly adheres to the inner wall surface of the duct in the pilot injection. Overheating may thus be prevented by a simple configuration.

According to the third aspect, in a case where the temperature of the duct is high, the amount of fuel adhesion of fuel that directly adheres to the inner wall surface of the duct in the pilot injection is increased than in a case where the temperature is low. Accordingly, a degree of cooling by latent heat may be increased as the temperature of the duct becomes higher, and cooling of the duct may be optimized.

According to the fourth aspect, the spray angle of fuel spray may be adjusted by adjusting the amount of lift of the needle valve of the fuel injection nozzle in the pilot injection. Accordingly, with the present aspect, the amount of fuel adhesion of fuel that directly adheres to the inner wall surface of the duct in the pilot injection may be adjusted by adjusting the amount of lift according to the index value for the temperature of the duct.

According to the fifth aspect, the maximum value of the amount of lift of the needle valve in the pilot injection is reduced in a case where the temperature of the duct is high than in a case where the temperature is low. The spray angle may thereby be increased as the temperature of the duct becomes higher, and cooling of the duct using latent heat may be optimized.

According to the sixth aspect, the rising speed to the maximum value of the amount of lift of the needle valve or the lowering speed from the maximum value in the pilot injection is reduced in a case where the temperature of the duct is high than in a case where the temperature is low. A period when the spray angle is great in the pilot injection may thus be made longer as the temperature of the duct becomes higher, and cooling of the duct using latent heat may be optimized.

According to the seventh aspect, the number of times of pilot injection is increased in a case where the temperature of the duct is high than in a case where the temperature is low. A period when the spray angle is great in the pilot injection may thus be made longer as the temperature of the duct becomes higher, and cooling of the duct using latent heat may be optimized.

DESCRIPTION OF EMBODIMENTS

Hereinafter, embodiments of the present disclosure will be described with reference to the drawings. The present disclosure is not limited to the number of pieces, the quantity, the amount, the range and the like of respective elements mentioned in the following embodiments, unless specifically specified otherwise or unless the disclosure is explicitly and theoretically specified by such numerals. Furthermore, structures described in the following embodiments are not always indispensable to the disclosure, unless specially specified otherwise or unless the disclosure is explicitly and theoretically specified by such structures.

First Embodiment

A first embodiment will be described with reference to the drawings.

Configuration of First Embodiment

Figure 1:
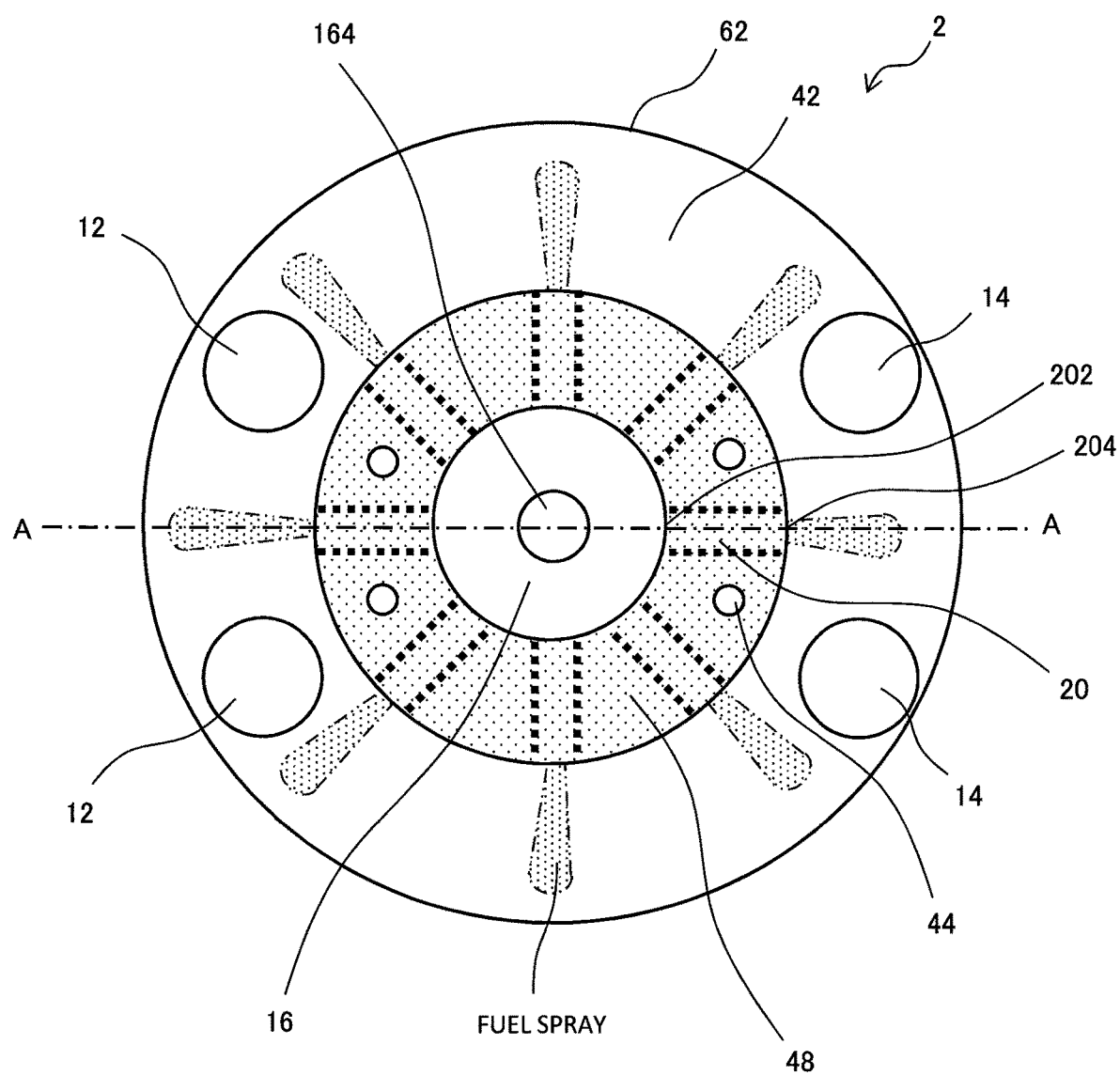
FIG. 1 is a diagram of an internal structure of a combustion chamber of an internal combustion engine according to a first embodiment schematically seen through from a lower surface side.
Figure 2:
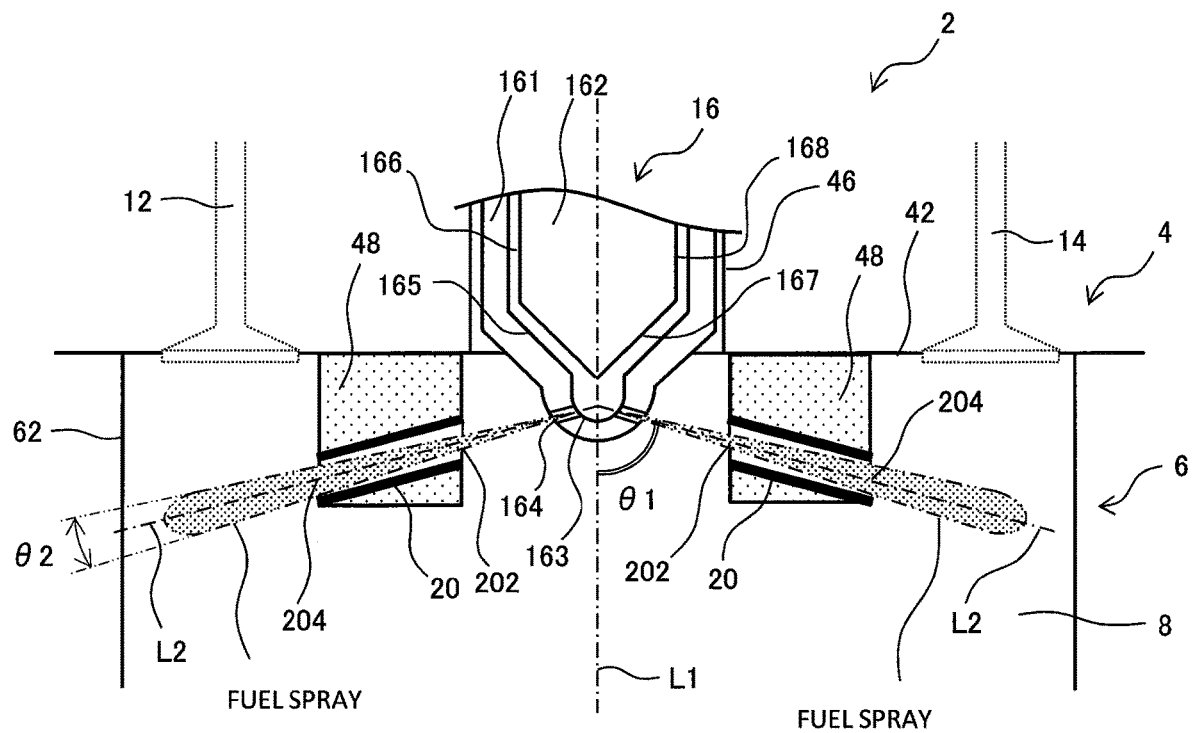
FIG. 2 is a diagram of the internal structure of the internal combustion engine in FIG. 1 schematically seen from a side surface side along a line A-A.

FIG. 1 is a diagram of an internal structure of a combustion chamber of an internal combustion engine according to the first embodiment schematically seen through from a lower surface side. FIG. 2 is a diagram of the internal structure of the internal combustion engine in FIG. 1 schematically seen from a side surface side along a line A-A. An internal combustion engine 2 of the first embodiment is an internal combustion engine of a compressed self-ignition type (hereinafter simply referred to as "engine") including a plurality of cylinders. FIGS. 1 and 2 illustrate an internal structure of one cylinder out of a plurality of cylinders included in the engine 2.

As illustrated in FIGS. 1 and 2, the engine 2 includes a cylinder head 4 and a cylinder block 6. A cylinder bore 62 is formed in the cylinder block 6. A piston, not illustrated, is arranged inside the cylinder bore 62. A combustion chamber 8 is formed in a space enclosed by the cylinder head 4, the cylinder bore 62, and a top surface of the piston.

Two intake valves 12 and two exhaust valves 14 are arranged on a top surface portion 42 of the cylinder head 4 forming the combustion chamber 8. A fuel injection nozzle 16 is arranged at a center of the top surface portion 42. More specifically, a mounting hole 46 for fixing the fuel injection nozzle 16 penetrates a center of the top surface portion 42, with a cylinder center axis L1 as a center axis. The fuel injection nozzle 16 is fixed in the mounting hole 46, with a nozzle hole 164 provided at a tip end exposed inside the combustion chamber 8.

The fuel injection nozzle 16 is for directly injecting fuel into the combustion chamber 8. The fuel injection nozzle 16 of the first embodiment is provided with eight nozzle holes 164 that perform injection equally and radially toward the cylinder bore 62. Each nozzle hole 164 is configured in such a way that an angle θ1 formed by a nozzle hole axis L2 indicating a fuel injection direction and the cylinder center axis L1 is in a range between 45 degrees and 90 degrees. A detailed description of an internal structure of the fuel injection nozzle 16 will be given later.

The engine 2 of the first embodiment includes, as a characteristic structure, a duct support 48 where ducts 20 are formed. The duct support 48 is an annular member which is formed in a protruding manner while surrounding a periphery of the nozzle hole 164 of the fuel injection nozzle 16. The duct support 48 is fixed by four bolts 44 in close contact with the top surface portion 42 of the cylinder head 4.

The duct 20 is configured by a straight hollow pipe that penetrates through the duct support 48 from an inlet 202 provided on an inner circumferential side of the duct support 48 toward an outlet 204 provided on an outer circumferential side. The duct 20 is configured such that a center axis of the hollow pipe coincides with the nozzle hole axis L2. With the engine 2 of the first embodiment, the duct 20 is provided for the nozzle hole axis L2 of each of the eight nozzle holes 164.

Next, the internal structure of the fuel injection nozzle 16 will be described. The fuel injection nozzle 16 includes a body 161 and a needle valve 162. The body 161 has a bottomed cylindrical shape where the needle valve 162 is reciprocably housed. The body 161 includes a sack portion 163, a plurality of nozzle holes 164, a seat portion 165, and a fuel supply channel 166. Fuel in a common rail, not illustrated, flows into the fuel supply channel 166. The seat portion 165 has a conical surface, with an inner diameter reduced toward a tip end. The sack portion 163 is formed into a semispherical shape, and is connected to a downstream end of the seat portion 165. The plurality of nozzle holes 164 are provided at a tip end of the body 161, and communicates the sack portion 163 and an outside.

The needle valve 162 is housed on an inner circumference of the body 161. The needle valve 162 starts or ends injection of fuel through the nozzle hole 164 by reciprocating along an axial direction of the body 161. The needle valve 162 includes a tip end portion 167 and a main body portion 168. The tip end portion 167 is formed into a conical shape, and can be seated on the seat portion 165. The main body portion 168 is a part on an axial rear end side of the tip end portion 167, and extends along the axial direction from an inlet side of the fuel supply channel 166 to the seat portion 165.

An actuator 169 (not illustrated) for driving the needle valve 162 in a direction of separating from the seat portion 165 is connected to the body 161. As the actuator, a solenoid actuator or a piezoelectric actuator is used, for example.

With the fuel injection nozzle 16, when the needle valve 162 moves to a tip end side in the axial direction by a biasing force of a return spring (not illustrated), the tip end portion 167 is seated on the seat portion 165. The position of the needle valve 162 at this time is referred to as a "seated position". When the needle valve 162 is at the seated position, the fuel supply channel 166 is blocked, and injection of fuel from the nozzle hole 164 into the combustion chamber 8 is stopped. Furthermore, with the fuel injection nozzle 16, when the needle valve 162 is moved from the seated position to a rear end side in the axial direction by being driven by the actuator 169, the tip end portion 167 is separated from the seat portion 165. An amount of movement of the needle valve 162 from the seated position at this time will be referred to as an "amount of lift" of the needle valve 162. The fuel supply channel 166 is open during a period when the tip end portion 167 is separated from the seat portion 165. Fuel that flows from the fuel supply channel 166 to the sack portion 163 is thus injected from the nozzle hole 164 into the combustion chamber 8.

Figure 3:
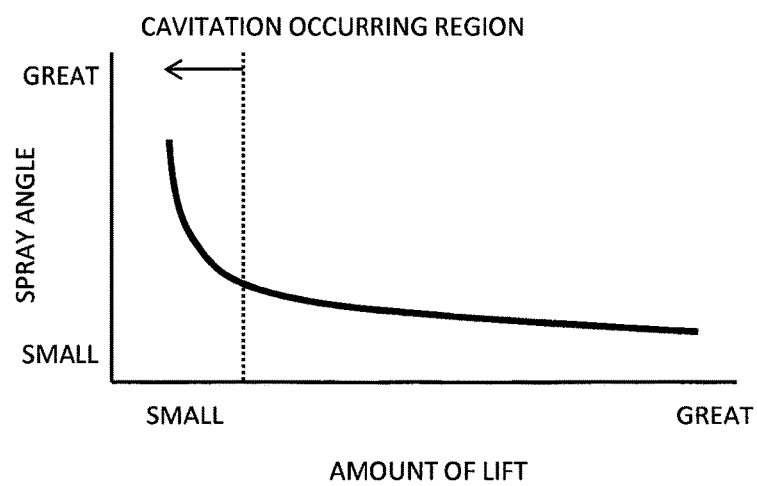
FIG. 3 is a diagram for describing a relationship between an amount of lift of a needle valve and a spray angle.

As illustrated in FIG. 2, fuel that is injected from the nozzle hole 164 is conical injection spray. A spreading angle θ2 of the fuel spray will be referred to as a "spray angle". The fuel injection nozzle 16 is capable of adjusting the spray angle by adjusting the amount of lift of the needle valve by the actuator 169. FIG. 3 is a diagram for describing a relationship between the amount of lift of the needle valve and the spray angle. As illustrated in the drawing, in a low-lift state where the amount of lift of the needle valve 162 is small, cavitation occurs in the seat portion 165. Accordingly, in the low-lift state of the needle valve 162, the spray angle is greater than in a high-lift state where the amount of lift of the needle valve 162 is great. Moreover, in the low-lift state of the needle valve 162, an amount of injection is smaller than in the high-lift state.

Figure 4:
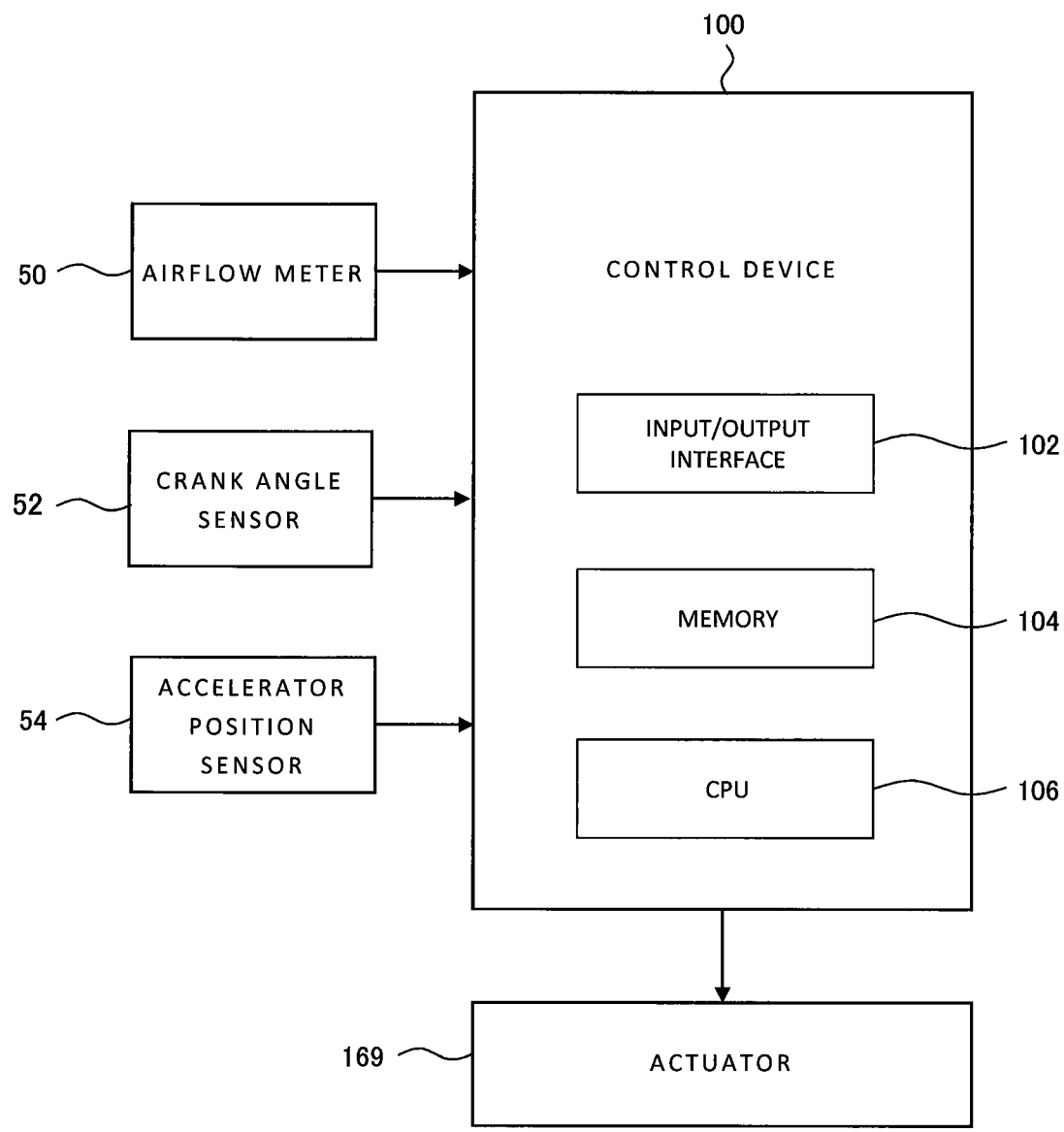
FIG. 4 is a diagram illustrating a schematic configuration of a control device provided in an engine of the first embodiment.

The engine 2 configured in the above manner is controlled by a control device 100. FIG. 4 is a diagram illustrating a schematic configuration of a control device provided in the engine of the first embodiment. The control device 100 is an electronic control unit (ECU). A processing circuit of the ECU 100 includes at least one input/output interface 102, at least one memory 104, and at least one CPU (processor) 106. The input/output interface 102 is provided to capture sensor signals from various sensors mounted in the engine, and to output operation signals to actuators provided in the internal combustion engine. The sensors from which the ECU 100 captures signals include various sensors that are necessary to control the engine, such as an airflow meter 50 for measuring a flow rate of fresh air that is taken into an intake passage, a crank angle sensor 52 for detecting a rotation angle of a crank shaft, an accelerator position sensor 54 for detecting a depression amount of an accelerator pedal, and the like. The actuators to which the ECU 100 sends the operation signals include various actuators such as the actuator 169 described above. Various control programs for controlling the internal combustion engine, maps and the like are stored in the memory 104. The CPU (processor) 106 reads out, from the memory, and executes control programs and the like, and generates operation signals based on captured sensor signals.

Each function of the control device 100 is implemented by software, firmware, or a combination of software and firmware. At least one of the software and the firmware is written as a program. At least one of the software and the firmware is stored in the at least one memory 104. The at least one processor 106 reads out and executes the program stored in the at least one memory 104 to thereby implement respective function of the control device 100. The at least one processor 106 may also be referred to as a central processing unit (CPU), a processing device, an arithmetic device, a microprocessor, a microcomputer, or a digital signal processor (DSP). For example, the at least one memory 104 is a non-volatile or volatile semiconductor memory, such as a random access memory (RAM), a read only memory (ROM), a flash memory, an erasable programmable read only memory (EPROM) or an electrically erasable programmable read-only memory (EEPROM), a magnetic disk, a flexible disk, or an optical disk.

In the case where the processing circuit of the control device 100 includes at least one piece of dedicated hardware, the processing circuit is a single circuit, a combined circuit, a programmed processor, a parallelly programmed processor, an application specific integrated circuit (ASIC), a field-programmable gate array (FPGA), or a combination thereof, for example. A function of each unit of the control device 100 may be implemented by a processing circuit. Alternatively, functions of the units of the control device 100 may be collectively implemented by a processing circuit.

Each function of the control device 100 may be implemented partially by dedicated hardware, and partially by software or hardware. In this manner, the processing circuit implements each function of the control device 100 by hardware, software, firmware, or a combination thereof.

Operation of First Embodiment

With the engine 2 of the compressed self-ignition type, fuel is injected from the fuel injection nozzle 16 in a state where air charged in the combustion chamber 8 is compressed. Combustion by self-ignition is preferably performed after the injected fuel spray is mixed with the charged air and homogenization of fuel concentration is advanced. However, for example, in a configuration where the duct 20 is not provided, fuel spray injected from the fuel injection nozzle 16 is possibly quickly overheated due to heat received from the combustion chamber 8, and self-ignition possibly occurs before mixing with the charged air is sufficiently performed. In this case, generation of smoke as a result of excessively rich fuel burning, and reduction in thermal efficiency due to prolongation of an afterburning period become problems.

With the engine 2 of the first embodiment, the duct 20 is provided inside the combustion chamber 8 as means for solving the above-described problems. Fuel spray that is injected from the fuel injection nozzle 16 is introduced into the duct 20 from the inlet 202. Since the inlet 202 of the duct 20 is exposed inside the combustion chamber 8, fresh air inside the combustion chamber 8 is also introduced into the duct 20. Inside of the duct 20 is not easily and directly affected by heat from the combustion chamber 8. Accordingly, fuel spray that is injected into the duct 20 is mixed with the charged air while being cooled, and the fuel concentration is homogenized without the fuel spray being self-ignited early. Mixed gas injected from the outlet 204 of the duct 20 self-ignites and burns by receiving heat from the combustion chamber 8.

In this manner, with the engine 2 of the first embodiment, premixing of the fuel spray that is injected and the charged air may be advanced while suppressing self-ignition, in the course of the fuel spray passing through the duct 20. Generation of smoke caused by self-ignition of excessively rich fuel which is not yet homogenized may thereby be suppressed. Moreover, with the engine 2 of the first embodiment, self-ignition while passing through the duct 20 is suppressed, and a self-ignition timing may be delayed. Accordingly, an afterburning period is reduced, and thermal efficiency may be increased.

The inventor of the present application recognized the following problem with respect to the above-described duct 20. That is, when high-load operation of the engine 2 continues, a duct temperature, which is a temperature of the duct 20 itself, becomes high, and a cooling effect on the fuel spray passing through the duct 20 is reduced. Premixing of the fuel spray and the charged air cannot be advance while suppressing self-ignition, and an effect on prevention of generation of smoke is reduced.

Accordingly, the inventor of the present application focused on an injection mode of pilot injection. Additionally, the pilot injection is injection of a small amount of fuel that is performed preceding main injection for obtaining an engine torque. A non-injection period may be interposed between the pilot injection and the main injection, or the pilot injection and the main injection may be performed successively. When the pilot injection is performed, a pre-mix combustion rate may be reduced, and an ignition delay time may be reduced and noise may be reduced.

Figure 5:
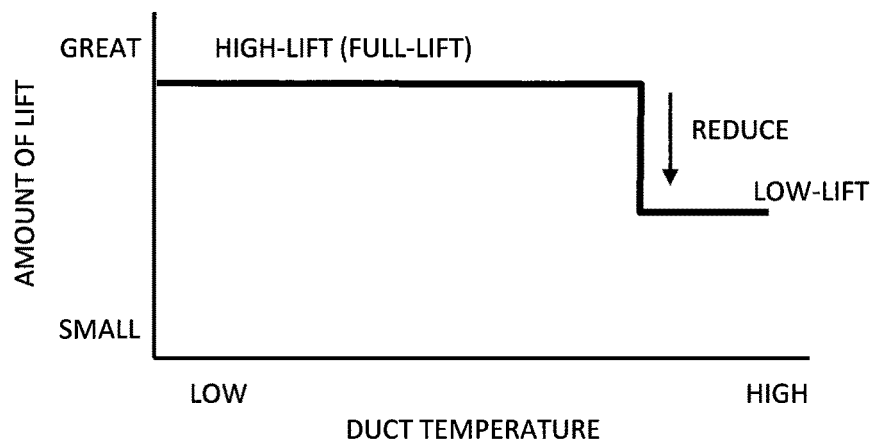
FIG. 5 is a diagram illustrating a relationship between a duct temperature and the amount of lift in pilot injection.
Figure 6:
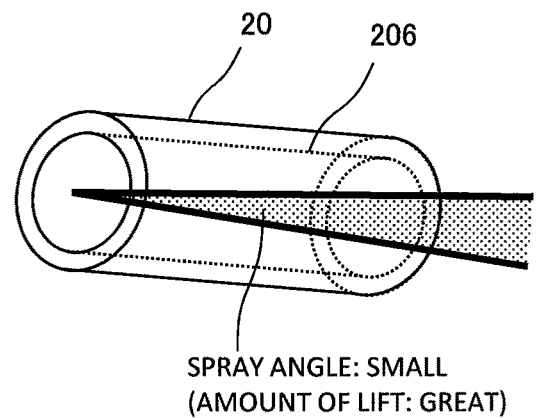
FIG. 6 is a schematic diagram for describing a relationship between fuel spray in pilot injection in a high-lift state and the duct.
Figure 7:
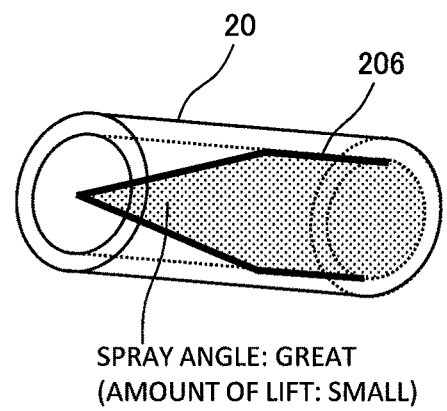
FIG. 7 is a schematic diagram for describing a relationship between fuel spray in pilot injection in a low-lift state and the duct.

The engine 2 of the present embodiment adopts a configuration where fuel spray that is injected in the pilot injection directly adheres to an inner wall surface of the duct 20. FIG. 5 is a diagram illustrating a relationship between the duct temperature and the amount of lift in the pilot injection. FIG. 6 is a schematic diagram for describing a relationship between fuel spray in the pilot injection in the high-lift state and the duct. FIG. 7 is a schematic diagram for describing a relationship between fuel spray in the pilot injection in the low-lift state and the duct. FIGS. 6 and 7 are schematic diagrams illustrating the part of the duct 20 in the engine 2 in a see-through manner.

As illustrated in FIG. 5, in the case where the duct temperature is in a low-temperature region, the control device 100 of the engine 2 controls the amount of lift of the needle valve 162 to be in the high-lift state (such as a full-lift state). In the pilot injection in this case, the spray angle of fuel spray is reduced, as illustrated in FIG. 6, and an amount of pilot injection is thereby increased. Accordingly, the fuel spray in the pilot injection does not contact an inner wall of the duct 20, and is injected through the inside of the duct 20 into the combustion chamber 8.

On the other hand, as illustrated in FIG. 5, in the case where the duct temperature is in a high-temperature region higher than the low-temperature region, the control device 100 of the engine 2 controls the amount of lift of the needle valve 162 to be in the low-lift state where the amount of lift is smaller than in the high-lift state. Such a case is a case where high-load operation of the engine 2 is continued, for example. In the pilot injection in this case, the amount of pilot injection is reduced to a small amount, and the spray angle of fuel spray is increased, as illustrated in FIG. 7. Accordingly, a part of fuel spray in the pilot injection contacts the inner wall surface of the duct 20. Fuel that adhered to the inner wall surface of the duct 20 absorbs heat from the duct 20 due to latent heat of vaporization. The duct 20 is thereby cooled before the main injection.

In this manner, when a part of fuel spray in the pilot injection adheres to the inner wall surface of the duct 20, a wall surface temperature of the duct 20 can be maintained at a temperature lower than a gas temperature in the combustion chamber 8 even at the time of high-load operation of the engine 2. Fuel spray in the main injection may thereby be cooled by the duct 20, and effects of the duct 20, such as reduction in smoke and increase in thermal efficiency, may be continuously achieved.

Specific Process of First Embodiment

Figure 8:
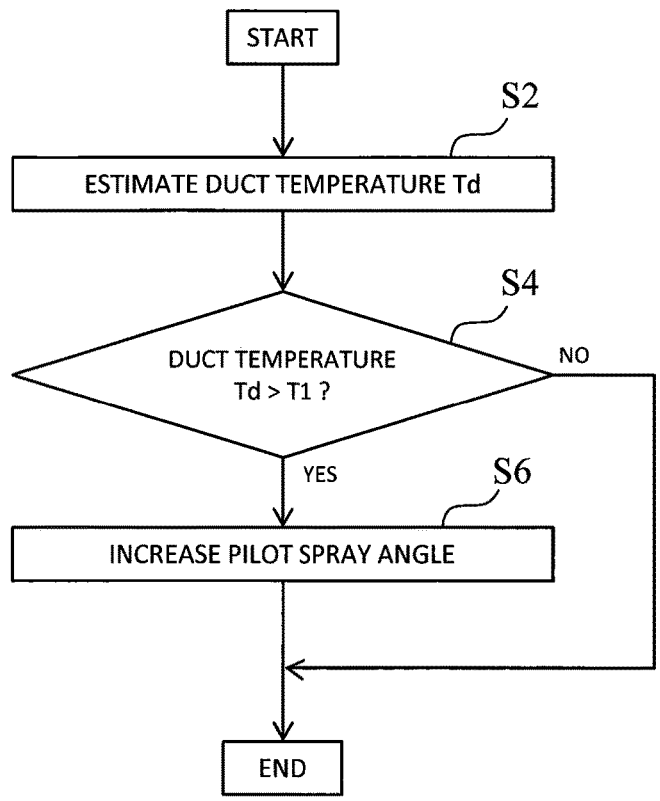
FIG. 8 is a flowchart illustrating a control routine that is performed by the engine of the first embodiment.

Next, specific processing of control that is performed by the control device 100 of the engine 2 of the first embodiment having the configuration as described above will be described with reference to a flowchart. FIG. 8 is a flowchart illustrating a control routine that is performed by the engine of the first embodiment. The routine illustrated in FIG. 8 is repeatedly performed by the control device 100 at a predetermined control cycle during operation of the engine 2.

With the routine illustrated in FIG. 8, first, a duct temperature Td is estimated (step S2). First, as various pieces of data necessary for estimation of the duct temperature Td, an engine speed, an amount of fuel injection, an amount of intake air, and the like are acquired. Next, the duct temperature Td is estimated based on an amount of heat input to the duct 20 and an amount of heat dissipation from the duct 20.

Specifically, the amount of heat input to the duct 20 may be estimated by using the engine speed, the amount of fuel injection, the amount of intake air, and the like, for example. The amount of heat dissipation from the duct 20 may be estimated by using an amount of fuel adhesion to the duct 20, a cooling water flow rate, a cooling water temperature, and the like. A deviation obtained by subtracting the amount of heat dissipation from the amount of heat input is an amount of heat possessed by the duct 20, and the duct temperature Td may be estimated based on this amount of heat.

Next, whether the duct temperature Td is higher than a predetermined reference temperature T1 is determined (step S4). The reference temperature T1 is a threshold for determining whether insufficient cooling of fuel spray due to overheating of the duct 20 becomes a problem or not, and a value that is stored in advance in the memory 104 is read. If positive determination is made, the duct temperature Td may be determined to be in a high-temperature region where the temperature is higher than the reference temperature T1. In this case, overheating of the duct 20 is determined to be a problem, and the next step is performed, and an injection angle of the pilot injection is increased (step S6).

Figure 9:
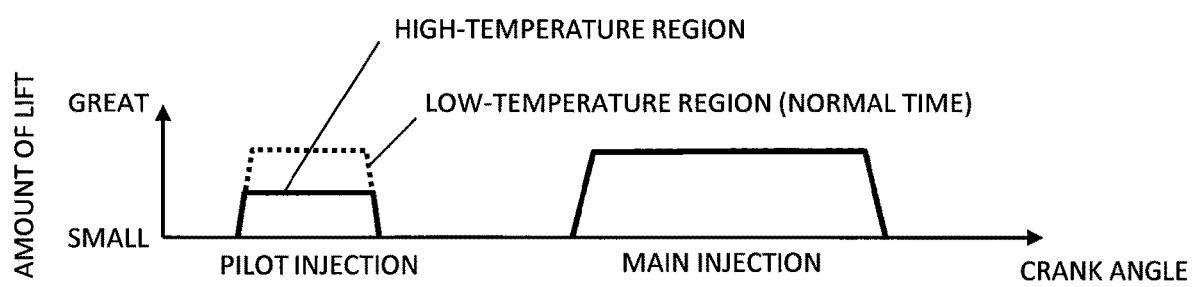
FIG. 9 is a diagram illustrating a relationship of the amount of lift of the needle valve to a crank angle.

FIG. 9 is a diagram illustrating a relationship of the amount of lift of the needle valve to a crank angle. As illustrated in the drawing, in the process in step S6, the actuator 169 is operated in such a way that a maximum value of the amount of lift in the pilot injection reaches the low-lift state lower than the high-lift state at a normal time. The spray angle of the pilot injection in a maximum lift state is thereby increased than at the normal time.

On the other hand, in the case where negative determination is made in step S4 described above, the duct temperature Td is determined to be in a low-temperature region where the temperature is at or below the reference temperature T1. In this case, it is determined that a problem of insufficient cooling of fuel spray caused by overheating of the duct 20 does not occur, and the amount of lift is maintained in the high-lift state at the normal time.

As described above, with the engine 2 of the first embodiment, in the case where the duct temperature Td is excessively increased, a part of the fuel spray in the pilot injection may be caused to adhere to the duct 20 to cool the duct 20. Fuel spray in the main injection may thus be cooled by the duct 20, and the effects of the duct 20, such as reduction in smoke and increase in thermal efficiency, may be continuously achieved.

Example Modification of First Embodiment

The engine 2 of the first embodiment may adopt a modified mode as described below.

The shape, the number and the like of the ducts 20 are not limited as long as fuel spray injected from the nozzle holes 164 of the fuel injection nozzle 16 passes from the inlets 202 to the outlets 204. For example, the duct 20 may be formed inside the cylinder head 4. Alternatively, a cylindrical duct 20 may be mounted on the top surface portion 42 of the cylinder head 4. This example modification may also be applied to an engine 2 of a second embodiment described later.

Figure 10:
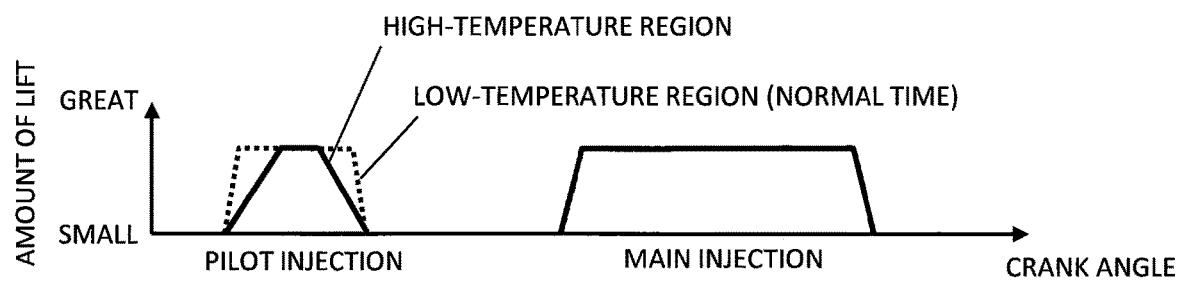
FIG. 10 is a diagram for describing an example modification of pilot injection adopted by the engine of the first embodiment.

Control for increasing the injection angle of the pilot injection is not limited to the method described above. FIG. 10 is a diagram for describing an example modification of the pilot injection adopted by the engine of the first embodiment. As illustrated in the drawing, in the pilot injection, in the case where the duct temperature Td is in the high-temperature region, a rising speed to the maximum value of the amount of lift may be reduced, or a lowering speed from the maximum value of the amount of lift may be reduced. With such control, a period when the injection angle is increased is longer in the pilot injection than at the normal time. The amount of fuel adhesion to the duct 20 is thereby increased than at the normal time, and the cooling effect of the duct 20 may be increased than at the normal time. This example modification may also be applied to the engine 2 of the second embodiment described later.

Figure 11:
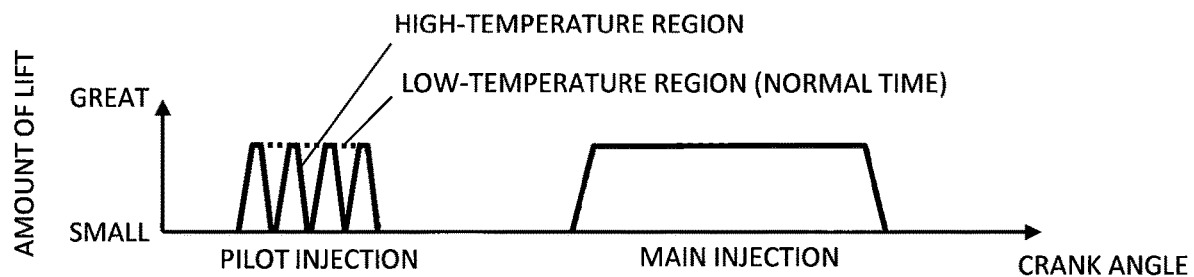
FIG. 11 is a diagram for describing another example modification of pilot injection adopted by the engine of the first embodiment.

FIG. 11 is a diagram for describing another example modification of the pilot injection adopted by the engine of the first embodiment. As illustrated in the drawing, in the pilot injection, in the case where the duct temperature Td is in the high-temperature region, a period when the amount of lift takes the maximum value may be reduced than at the normal time, and also, the number of times of injection in the pilot injection may be increased. With such control, a period when the injection angle is increased is longer in the pilot injection than at the normal time. The amount of fuel adhesion to the duct 20 is thereby increased than at the normal time, and the cooling effect of the duct 20 may be increased than at the normal time. This example modification may also be applied to the engine 2 of the second embodiment described later.

A total injection time of the pilot injection for when the duct temperature Td is in the high-temperature region does not have to be the same as when the duct temperature Td is in the low-temperature region (normal time). That is, the pilot injection illustrated in FIGS. 9 to 11 indicates cases where the total injection time is the same for when the duct temperature Td is in the high-temperature region and when the duct temperature Td is in the low-temperature region (normal time). However, the total injection time for when the duct temperature Td is in the high-temperature region may be shorter or longer than at the normal time as long as a total amount of fuel adhesion to the inner wall surface of the duct 20 is increased. Particularly, the amount of injection in the pilot injection is more reduced, the more increased the spray angle is. Accordingly, if the injection time of the pilot injection in the case where the duct temperature Td is in the high-temperature region is made longer than at the normal time, the amount of fuel adhesion to the inner wall surface of the duct 20 may be increased while preventing a total amount of injection in the pilot injection from being reduced than at the normal time. This example modification may also be applied to the engine 2 of the second embodiment described later.

The control device 100 may change the amount of lift of the needle valve 162 in a stepwise manner according to the duct temperature Td. In this case, the control device 100 operates the actuator 169 in such a way that the amount of lift is reduced as the duct temperature Td becomes higher. This enables the amount of fuel adhesion to the inner wall surface of the duct 20 to be increased as the duct temperature Td becomes higher, and thus, cooling according to the duct temperature Td may be performed.

In the pilot injection, a part of the fuel spray may constantly contact the duct 20 regardless of the duct temperature Td. According to such a configuration, cooling of the duct 20 may be continuously performed.

Second Embodiment

Features of Second Embodiment

Next, the second embodiment of the present disclosure will be described. The engine of the second embodiment may be implemented by using the hardware configuration illustrated in FIG. 1, and by causing the control device 100 to perform a process according to a flowchart in FIG. 12 described later.

The engine 2 of the second embodiment is characteristic in that the spray angle of the pilot injection is controlled according to engine load of the engine 2 instead of the duct temperature Td. That is, when the engine load is increased due to an increase in the amount of injection in one cycle, a combustion temperature inside the combustion chamber 8 rises. When the combustion temperature rises, the amount of heat input to the duct 20 is increased, and the duct temperature Td is thereby increased. That is, the amount of injection of the engine 2 may be used as an index value that serves as an index for the duct temperature Td.

Accordingly, when in a low-load region where the amount of injection is small, the control device 100 of the engine 2 of the second embodiment controls the amount of lift of the needle valve 162 to be in a high-lift state (such as a full-lift state). In this case, because the spray angle in the pilot injection is small, fuel spray does not contact the inner wall of the duct 20, but is injected into the combustion chamber 8 through the duct 20.

On the other hand, when in a high-load region where the amount of injection is greater than in the low-load region, the control device 100 of the engine 2 controls the amount of lift of the needle valve 162 to be in the low-lift state where the amount is smaller than in the high-lift state. In this case, the spray angle in the pilot injection is great, and a part of fuel spray contacts the inner wall of the duct 20. Fuel that adhered to the inner wall of the duct 20 absorbs heat from the duct 20 due to latent heat of vaporization. The duct 20 is thereby cooled before the main injection.

In this manner, with the engine 2 of the second embodiment, the wall surface temperature of the duct 20 can be maintained at a lower temperature than the gas temperature in the combustion chamber 8 even at the time of high-load operation of the engine 2. Fuel spray in the main injection may thereby be cooled by the duct 20, and effects of the duct 20, such as reduction in smoke and increase in thermal efficiency, may be continuously achieved.

Specific Process of Second Embodiment

Figure 12:
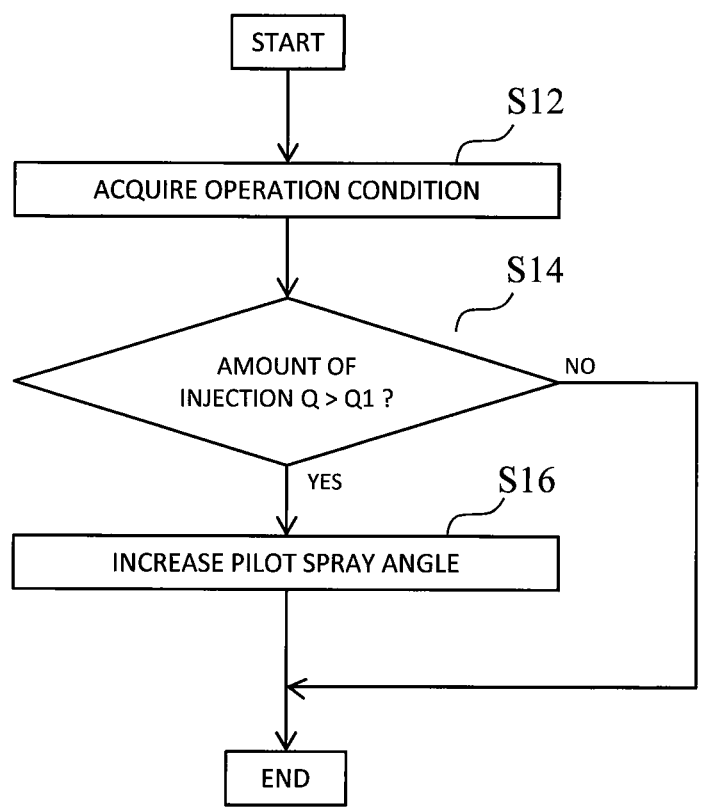
FIG. 12 is a flowchart illustrating a control routine that is performed by an engine of a second embodiment.

Next, specific processing of control that is performed by the control device 100 of the engine 2 of the second embodiment having the configuration as described above will be described with reference to a flowchart. FIG. 12 is a flowchart illustrating a control routine that is performed by the engine of the second embodiment. The routine illustrated in FIG. 12 is repeatedly performed by the control device 100 at a predetermined control cycle during operation of the engine 2.

With the routine illustrated in FIG. 12, first, an operation condition is acquired (step S12). Specifically, an amount of injection Q in one cycle is acquired. Next, whether the amount of injection Q is greater than a predetermined reference amount of injection Q1 is determined (step S14). The reference amount of injection Q1 is a threshold for determining whether insufficient cooling of fuel spray due to overheating of the duct 20 becomes a problem or not, and a value that is stored in advance in the memory 104 is read. If positive determination is made, the amount of injection Q may be determined to be in the high-load region where the amount of injection Q is greater than the reference amount of injection Q1. In this case, overheating of the duct 20 is determined to be a problem, and the next step is performed, and the injection angle of the pilot injection is increased (step S16). Specifically, as illustrated in FIG. 9, the actuator 169 is operated in such a way that the maximum value of the amount of lift in the pilot injection reaches the low-lift state lower than the high-lift state at the normal time. The spray angle of the pilot injection is thereby increased than for the normal time.

On the other hand, in the case where negative determination is made in step S14 described above, the amount of injection Q is determined to be in the low-load region where the amount is equal to or smaller than the reference amount of injection Q1. In this case, it is determined that a problem of insufficient cooling of fuel spray caused by overheating of the duct 20 does not occur, and the amount of lift is maintained in the high-lift state at the normal time.

As described above, with the engine 2 of the second embodiment, by using the amount of injection Q as an index value for the duct temperature Td, the duct 20 which is overheated may be effectively cooled. Fuel spray in the main injection may thus be cooled by the duct 20, and the effects of the duct 20, such as reduction in smoke and increase in thermal efficiency, may be continuously achieved.

Example Modification of Second Embodiment

The engine 2 of the second embodiment may adopt a modified mode as described below.

The index value for the duct temperature Td is not limited to the amount of injection Q of the engine 2. That is, the control device 100 may control the amount of lift by using index values as described below, for example.

When a cooling water temperature or a lubricating oil temperature of the engine 2 rises, the amount of heat dissipation from the duct 20 is reduced, and the duct temperature Td thereby rises. Accordingly, the control device 100 may use the cooling water temperature or the lubricating oil temperature as the index value for the duct temperature Td. In this case, the control device 100 may perform control to achieve the low-lift state when the cooling water temperature or the lubricating oil temperature is in a region corresponding to the high-temperature region of the duct temperature Td, and may perform control to achieve the high-lift state when the cooling water temperature or the lubricating oil temperature is in a region corresponding to the low-temperature region of the duct temperature Td.

Even in a case where the load of the engine 2 is in the high-load region, if such a state is temporary, the duct 20 is possibly not excessively heated. Accordingly, the control device 100 may use a duration when the load of the engine 2 is in the high-load region as the index value for the duct temperature Td. In this case, the control device 100 may perform control to achieve the low-lift state when the duration is in a region corresponding to the high-temperature region of the duct temperature Td, and may perform control to achieve the high-lift state when the duration is in a region corresponding to the low-temperature region of the duct temperature Td.

When an intake temperature of the engine 2 is high, the amount of heat input to the duct 20 is increased, and thus, the duct temperature Td rises. Accordingly, the control device 100 may use the intake temperature of the engine 2 as the index value for the duct temperature Td. In this case, the control device 100 detects the intake temperature from an outside air temperature or an intake manifold temperature, and may perform control to achieve the low-lift state when the detected intake temperature is in a region corresponding to the high-temperature region of the duct temperature Td, and may perform control to achieve the high-lift state when the detected intake temperature is in a region corresponding to the low-temperature region of the duct temperature Td.

When the duct temperature Td rises, an ignition delay time is reduced. Accordingly, the control device 100 may use the ignition delay time as the index value for the duct temperature Td. In this case, the control device 100 detects the ignition delay time from a detection value of an in-cylinder pressure sensor or the crank angle sensor 52, and may perform control to achieve the low-lift state when the detected ignition delay time is in a region corresponding to the high-temperature region of the duct temperature Td, and may perform control to achieve the high-lift state when the detected ignition delay time is in a region corresponding to the low-temperature region of the duct temperature Td.

In the case where concentration of smoke in exhaust gas is high, it is determined that the duct 20 is overheated and fuel spray in the main injection is not cooled. Accordingly, the control device 100 may use the smoke concentration in the exhaust gas as the index value for the duct temperature Td. In this case, the control device 100 detects the smoke concentration from a detection value of a soot sensor for detecting an amount of soot, and may perform control to achieve the low-lift state when the detected smoke concentration is in a region corresponding to the high-temperature region of the duct temperature Td, and may perform control to achieve the high-lift state when the detected smoke concentration is in a region corresponding to the low-temperature region of the duct temperature Td.

In the case where a state in which a vehicle speed of a vehicle where the engine 2 is mounted is high is continued, it can be determined that the high-load operation of the engine is continued. Accordingly, the control device 100 may use a duration of the state in which the vehicle speed is high as the index value for the duct temperature Td. In this case, the control device 100 calculates a duration when the vehicle speed detected by a vehicle speed sensor is higher than a vehicle speed corresponding to predetermined high-load operation, and may perform control to achieve the low-lift state when the duration is in a region corresponding to the high-temperature region of the duct temperature Td, and may perform control to achieve the high-lift state when the duration is in a region corresponding to the low-temperature region of the duct temperature Td.

What is claimed is:

1. An internal combustion engine of a compressed self-ignition type that performs combustion by injecting fuel into a compressed combustion chamber, the internal combustion engine comprising:
    a fuel injection nozzle provided with a nozzle hole for injecting fuel, the nozzle hole exposed from a cylinder head of the internal combustion engine to the combustion chamber;
    a hollow duct, an inlet and an outlet of which are exposed to the combustion chamber, wherein the duct is provided in a manner allowing fuel spray injected from the nozzle hole of the fuel injection nozzle to pass through from the inlet to the outlet, and the fuel injection nozzle and the duct are configured such that a part of fuel spray that is injected from the nozzle hole in pilot injection that is performed before main injection directly adheres to an inner wall surface of the duct; and
    an electronic control unit that adjusts an amount of fuel adhesion of fuel that directly adheres to the duct in the pilot injection,
    wherein the electronic control unit is configured
        to acquire an index value that serves as an index for a temperature of the duct, and
        in a case where the index value is in a region corresponding to a high-temperature region of the temperature of the duct, to increase the amount of fuel adhesion compared to a case where the index value is in a region corresponding to a low-temperature region.

2. The internal combustion engine according to claim 1, wherein the fuel injection nozzle includes
    a body including the nozzle hole at a tip end portion,
    a needle valve that is housed in a manner capable of moving along an axial direction inside the body, and
    an actuator that adjusts an amount of lift of the needle valve from a seated position,
    the fuel injection nozzle increases an injection angle of fuel injection from the nozzle hole as the amount of lift of the needle valve from the seated position becomes smaller, and
    the electronic control unit is configured to operate the actuator according to the index value.

3. The internal combustion engine according to claim 2, wherein, in a case where the index value is in a region corresponding to the high-temperature region of the temperature of the duct, the electronic control unit is configured to operate the actuator such that a maximum value of the amount of lift in the pilot injection is reduced than in a case where the index value is in a region corresponding to the low-temperature region.

4. The internal combustion engine according to claim 2, wherein, in a case where the index value is in a region corresponding to the high-temperature region of the temperature of the duct, the electronic control unit is configured to operate the actuator such that a rising speed to a maximum value of the amount of lift or a lowering speed from the maximum value in the pilot injection is reduced than in a case where the index value is in a region corresponding to the low-temperature region.

5. The internal combustion engine according to claim 2, wherein, in a case where the index value is in a region corresponding to the high-temperature region of the temperature of the duct, the electronic control unit is configured to operate the actuator such that a period when the amount of lift takes a maximum value in the pilot injection is reduced and a number of times of the pilot injection is increased than in a case where the index value is in a region corresponding to the low-temperature region.

* * * * *